United States Patent [19]

Davis et al.

[11] 4,286,074

[45] Aug. 25, 1981

[54] AMINE-TERMINATED GRAFT COPOLYMER DISPERSIONS AND POLYURETHANES PREPARED THEREFROM

[75] Inventors: John E. Davis, Woodhaven; Moses Cenker, Trenton, both of Mich.

[73] Assignee: BASF Wyandotte Corporation, Wyandotte, Mich.

[21] Appl. No.: 137,194

[22] Filed: Apr. 4, 1980

[51] Int. Cl.$^3$ .................... C08G 18/14; C08G 18/63
[52] U.S. Cl. .................................. 521/137; 521/163; 528/75; 525/412; 528/392; 260/32.6 PQ
[58] Field of Search ............. 260/32.6 PQ; 521/137; 528/75

[56] References Cited

U.S. PATENT DOCUMENTS

| | | |
|---|---|---|
| Re. 28,715 | 2/1976 | Stamberger ............ 521/137 |
| Re. 29,014 | 10/1976 | Pizzini et al. ............ 521/137 |
| 3,275,606 | 9/1966 | Kujawa et al. ............ 521/162 |
| 3,652,639 | 3/1972 | Pizzini et al. ............ 260/465.4 |
| 3,652,659 | 3/1972 | Kniger et al. ............ 560/242 |
| 3,875,258 | 4/1975 | Patton et al. ............ 526/75 |
| 3,950,317 | 4/1976 | Patton et al. ............ 526/78 |
| 4,014,846 | 3/1977 | Ramlow et al. ............ 260/33.2 R |
| 4,119,582 | 10/1978 | Matsubara et al. ............ 521/112 |
| 4,122,056 | 10/1978 | Ramlow et al. ............ 260/29.6 NR |

*Primary Examiner*—H. S. Cockeram
*Attorney, Agent, or Firm*—Norbert M. Lisicki

[57] ABSTRACT

Stable graft polymer dispersions are prepared employing in situ free radical polymerization of ethylenically unsaturated monomer or monomers in an amine-terminated polyoxyalkylene polyether polymer. These dispersions are useful in the preparation of polyurethane foams which have improved tensile strength, elongation, load deflection and tear strength properties.

22 Claims, No Drawings

AMINE-TERMINATED GRAFT COPOLYMER DISPERSIONS AND POLYURETHANES PREPARED THEREFROM

BACKGROUND OF THE INVENTION

1. Field of the Invention

The present invention relates to stable graft polymer dispersions of high monomer conversion and polyurethanes prepared therefrom. More particularly, the invention relates to graft polymer and copolymer dispersions prepared by the process employing in situ free radical polymerization of ethylenically unsaturated monomer or monomers in the amine-terminated polyoxyalkylene polyether polymers and the polyurethane prepared therefrom.

2. Prior Art

The prior art, as evidenced by U.S. Pat. Nos. 3,652,659; 3,875,258; 3,950,317, and U.S. Pat. Nos. Re. 28,715 and Re. 29,014, teaches the preparation of graft polymer dispersions which are useful in the preparation of polyurethanes by the polymerization of ethylenically unsaturated monomers in the presence of polyols. These patents disclose various methods of preparing graft polymer dispersions. However, none of the prior art teaches the desirability of using an amine-terminated polyoxyethylene polyether polymer for the preparation of graft polymer and copolymer dispersions.

SUMMARY OF THE INVENTION

It has been discovered that difficult-to-use monomers such as styrene, as well as others, can be incorporated into graft polymer dispersions giving stable dispersions.

The present invention relates to graft polymer and copolymer dispersions which are prepared by the in situ polymerization in the presence of a free radical initiator, of an ethylenically unsaturated monomer or a mixture of monomers, in an amine-terminated polyoxyalkylene polyether polymer.

Polyurethane foams prepared employing the amine-terminated graft polymer and copolymer dispersions displayed improved tensile strength, elongation, load deflection and tear strength when compared to hydroxyl-terminated graft polymer and copolymer dispersions.

DESCRIPTION OF THE PREFERRED EMBODIMENTS

In accordance with the process stable graft copolymer dispersions are prepared by the in situ free radical polymerization of an ethylenically unsaturated monomer or mixtures of said monomers in an amine-terminated polyoxyalkylene polyether polymer.

The amine-terminated polyoxyalkylene polyether polymer may be prepared by procedures well known to those skilled in the art. One possible route is the conversion of the terminal hydroxyls of a polyoxyalkylene polyether polyol to amine groups by reacting with acrylonitrile and subsequent reduction to an amine-terminated polyoxyalkylene polyether polymer. The amine-terminated polyoxyalkylene polyether polymer may or may not contain any unsaturation within the molecule.

The polyols which may be employed in the present invention for the preparation of the amine-terminated polyoxyalkylene polyether polymers are well known in the art. Both conventional polyols essentially free from ethylenic unsaturation such as those described in U.S. Pat. No. Re. 28,715 and unsaturated polyols such as those described in U.S. Pat. No. 3,652,659 and Re. 29,014 may be employed in the invention. Representative polyols essentially free from ethylenic unsaturation which may be employed in the present invention are well known in the art. They are often prepared by the catalytic condensation of an alkylene oxide or mixture of alkylene oxides either simultaneously or sequentially with an organic compound having at least two active hydrogen atoms such as evidenced by U.S. Pat. Nos. 1,922,459; 3,190,927, and 3,346,557.

Representative polyols include polyhydroxyl-containing polyesters, polyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also, alkylene oxide adducts of compounds which contain one —SH group and one —OH group as well as those which contain an amino group and a —SH group may be used. Generally, the equivalent weight of the polyols will vary from 100 to 5,000, preferably from 125 to 3000.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha,beta-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, alpha-methyl glucoside, pentaerythritol, and sorbitol. Also included within the term "polyhydric alcohol" are compounds derived from phenol such as 2,2'-bis(4,4'-hydroxyphenyl)propane, commonly known as Bisphenol A.

Any suitable polyalkylene polyether polyol may be used such as the polymerization product of an alkylene oxide or of an alkylene oxide with a polyhydric alcohol. Any suitable polyhydric alcohol may be used as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of sequential addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)-propane and blends thereof having equivalent weights of from 100 to 5000.

Suitable polyhydric polythioethers which may be condensed with alkylene oxides include the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylenediamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,3-propanedithiol, and 1,6-hexanedithiol; alkenethiols such as 2-butene-1,4-dithiol; and alkynethiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,4-diaminotoluene; aliphatic amines such as methylamine, triisopropanolamine, ethylenediamine, 1,3-diaminopropane, 1,3-diaminobutane, and 1,4-diaminobutane.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

The unsaturated polyols which may be employed in the present invention may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene-3,4-epoxide, butadiene monoxide, vinyl glycidyl ether(1-vinyloxy-2,3-epoxy propane), glycidyl methacrylate and 3-allyloxypropylene oxide (allyl glycidyl ether). If a polycarboxylic acid or anhydride is employed to incorporate unsaturation into the polyols, it is preferable to react the unsaturated polyol with an alkylene oxide, preferably ethylene or propylene oxide, to replace the carboxyl groups with hydroxyl groups prior to employment in the present invention. The amount of alkylene oxide employed is such to reduce the acid number of the unsaturated polyol to about one or less.

To prepare the unsaturated polyols for use in the present invention, from about 0.05 mole to about 3.0 moles, preferably from 0.30 mole to 1.50 moles, of said organic compound per mole of polyol is employed. The preparation of the unsaturated polyols employed in the present invention follows conventional prior art procedures such as disclosed in U.S. Pat. No. 3,275,606 and U.S. Pat. No. 3,280,077. Generally, this requires a reaction at a temperature between 0° C. and 130° C. Both acidic catalysts, such as Lewis acid catalysts and basic catalysts such as alkali metal hydroxides, may be used. In addition, a noncatalyzed reaction may be used employing temperatures between 50° C. and 200° C.

As mentioned above, the graft copolymer dispersions of the invention are prepared by the in situ free radical polymerization, in the above-described amine-terminated polyoxyalkylene polyether polymers of an ethylenically unsaturated monomer or a mixture of ethylenically unsaturated monomers. Representative ethylenically unsaturated monomers which may be employed in the present invention include butadiene, isoprene, 1,4-pentadiene, 1,5-hexadiene, 1,7-octadiene, styrene, alpha-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxylstyrene, methyl 4-vinylbenzoate, phenoxystyrene, p-vinyldiphenyl sulfide, p-vinylphenyl oxide, and the like; the acrylic and substituted acrylic monomers such as acrylonitrile, acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl alpha-chloroacrylate, ethyl alpha-ethoxyacrylate, methyl alpha-acetaminoacrylate, butyl acrylate, 2-ethylhexyl acrylate, phenyl acrylate, phenyl methacrylate, alpha-chloroacrylonitrile, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxyacetate, vinyl benzoate, vinyl iodide, vinyltoluene, vinylnaphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phosphonates such as bis(beta-chloroethyl) vinylphosphonate, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention. Preferably, the monomer is selected from the group consisting of acrylonitrile, styrene and mixtures thereof.

The amount of ethylenically unsaturated monomer employed in the polymerization reaction is generally from one percent to 60 percent, preferably from 15 percent to 30 percent, based on the total weight of the dispersion product. The polymerization occurs at a temperature between about 80° C. and 170° C., preferably from 85° C. to 135° C.

Illustrative initiators which may be employed are the well-known free radical types of vinyl polymerization initiators, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-alpha-cumyl peroxide, dipropyl peroxide, diisopropyl peroxide, isopropyl-t-butyl peroxide, butyl-t-butyl peroxide, dilauroyl peroxide, difuroyl peroxide, bis(triphenylmethyl)peroxide, bis(p-methoxybenzoyl)peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, alpha-methylbenzyl hydroperoxide, alpha-methyl-alpha-ethyl benzyl hydroperoxide, tetralin hydroperoxide, triphenylmethyl hydroperoxide, diphenylmethyl hydroperoxide, alpha-alpha'-azobis(2-methylbutyronitrile), alpha,alpha'-azobis(2-methylheptonitrile), 1,1'-azobis(1-cyclohexane carbonitrile), dimethyl alpha,alpha'-azobis(isobutyrate), 4,4'-azobis(4-cyanopentanoic acid), azobis-(isobutyronitrile), 1-t-amylazo-1-cyanocyclohexane, 2-t-butylazo-2-cyanobutane, persuccinic acid, diisopropyl peroxy dicarbonate, and the like; a mixture of catalysts may also be used. Azobis-(isobutyronitrile) and 2-t-butylazo-2-cyanobutane are the preferred catalysts. Generally, from about 0.5 percent to about 10 percent, preferably from about 1 percent to about 4 percent, by weight of catalyst based on the weight of the monomer will be employed in the process of the invention.

The polyurethane foams employed in the present invention are generally prepared by the reaction of an amine-terminated polyoxyalkylene polyether polymer with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane plastics are disclosed in U.S. Pat. No. Re. 24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, tolylene-2,4-diisocyanate, tolylene-2,6-diisocyanate, mixtures of 2,4- and 2,6-tolylene diisocyanate, hexamethylene-1,6-diisocyanate, isophorone diisocyanate, lysine diisocyanate, tetramethylene-1,4-diisocyanate, cyclohexane-1,4-diisocyanate, 4,4'-dicyclohexylmethane diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4"-triphenylmethane triisocyanate, polymethylene polyphenylisocyanate and tolylene 2,4,6-triisocyanate; and the tetraisocyanate and tolylene 2,4,6-triisocyanate; and the tetraisocyanates such as 4,4'-dimethyldiphenylmethane-2,2',5,5'-tetraisocyanate. Especially useful due to their availability and properties are tolylene diisocyanate, diphenylmethane-4,4'-diisocyanate and polymethylene polyphenylisocyanate.

Crude polyisocyanate may also be used in the compositions of the present invention, such as crude toluene diisocyanate obtained by the phosgenation of a mixture of toluenediamines or crude diphenylmethane isocyanate obtained by the phosgenation of crude diphenylmethanediamine. The preferred unreacted or crude isocyanates are disclosed in U.S. Pat. No. 3,215,652.

Isocyanurate capped polymers derived from these diisocyanates may also be employed.

As mentioned above, the amine-terminated graft polymer and copolymer dispersions employed along with polyhydroxyl-containing component commonly employed in the art. Any of the polyhydroxyl-containing components which are described above for use in the preparation of the amine-terminated polymer and copolymer dispersions graft polyols may be employed in the preparation of the polyurethane foams useful in the present invention.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water and primary and secondary diamines which react more readily with the prepolymer than does water such as phenylenediamine, 1,4-cyclohexane-bis-(methylamine), ethylenediamine, diethylenetriamine, N-(2-hydroxypropyl)ethylenediamine, N,N'-bis(2-hydroxypropyl)ethylenediamine, piperazine, and 2-methylpiperazine.

Any suitable catalyst may be used including tertiary amines such as, for example, triethylendiamine, N-methylmorpholine, N-ethylmorpholine, diethyl ethanolamine, N-cocomorpholine, 1-methyl-4-(dimethylaminoethyl)piperazine, dimethyl-3-methoxypropylamine, N-dimethyl-N'-methyl isopropyl propylenediamine, N,N'-diethyl-3-diethyl amino propylamine, dimethyl benzylamine, and the like. Other suitable catalysts are, for example, tin compounds such as stannous chloride, tin salts of carboxylic acids, such as dibutyltin di-2-ethyl hexoate, tin alcoholates such as stannous octoate, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surfactants have been found satisfactory. Nonionic surfactants are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers or long chain alcohols, tertiary amine or alkylolamine salts of long chain alkyl acid sulfate esters, alkylsulfonic esters, and alkylarylsulfonic acids.

The following examples illustrate the nature of the invention. All parts are by weight unless otherwise stated. In the examples, the physical properties of the polyurethane foam were determined by the following ASTM tests:

| | |
|---|---|
| Tensile Strength | D-412 |
| Elongation | D-412 |
| Block Tear | D-470 |
| Compression Load | D-1564 |
| Compression Set | D-395 |

In these examples, the composition of the polymers and polyols as designated by the letters A, B, etc., are as follows:

Polymer A is a polyoxypropylene polyether polymer terminated with primary amino groups having an equivalent weight of 1000.

Polymer B is a polyoxypropylene polyether polymer terminated with secondary amino groups having an equivalent weight of 1000.

Polymer C is propylene oxide adduct of trimethylolpropane terminated with primary amino groups having an equivalent weight of 125.

Polyol A is a propylene oxide, ethylene oxide adduct of trimethylolpropane having an equivalent weight of 2000 and containing 15 weight percent ethylene oxide.

Polyol B is a propylene oxide, ethylene oxide adduct of glycerine and propylene glycol containing 0.3 mole of unsaturation per mole of polyol, having an ethylene oxide content of 15 weight percent, an equivalent weight of 1700 and which contains a graft copolymer dispersion of 20 weight percent consisting of 2:3 acrylonitrile:styrene.

EXAMPLE 1

A one-liter reaction flask, equipped with a stirrer, thermometer, water-cooled reflux condenser, nitrogen inlet and 2 precision laboratory pumps for metering the monomer mixture and the catalyst/diamine mixture, was charged with 215.8 parts of polymer A. After flushing the reactor well with nitrogen, a steady and continuous addition of a mixture of 40.6 parts of styrene and 40.6 parts of acrylonitrile in one stream and a suspension of 1.63 parts of 2,2'-azobis(isobutyronitrile) in 109.2 parts of polymer A in a second stream was made to the reactor maintained at 124°–125° C. The monomer stream was added over a period of 120 minutes to the reactor while the catalyst/diamine stream was added over a period of 130 minutes. After all the catalyst stream was in, the reaction was allowed to continue for an additional 30 minutes at 125° C. Then the reaction mixture was stirred at 125° C. under a vacuum (0.13 mm Hg pressure) to remove the volatiles. The product had an amine equivalent weight of 1350, and a Brookfield viscosity at 25° C. of 1250 cps.

EXAMPLE 2

Polymer B was prepared in the following manner. A clean, dry, nitrogen-filled stainless steel autoclave equipped with a thermometer, stirrer, nitrogen source, hydrogen source, and heat exchanger was charged with 540.0 grams of a 2000 mole weight primary amine-terminated polyoxypropylene polymer, 62.73 grams of distilled acetone, 1.62 grams of distilled water, and 0.54 grams of sulfided 5 percent platinum on carbon (50 percent moisture). The autoclave was purged 3 times with nitrogen, and pressure tested to 500 psig. It was then purged 3 times with hydrogen, and finally pressurized with hydrogen at 200 psig. While the reaction mixture was being stirred, the temperature was gradually increased over a period of 60 minutes. At the same time, the hydrogen pressure was increased to 360 psig.

After 3 hours at 150° C., the reaction mixture was cooled and purged 3 times with nitrogen before air was allowed into the reactor. The reactor mixture was then treated with activated charcoal and anhydrous magnesium sulfate, filtered and stripped on a rotary evaporation at 0.2 millimeter Hg pressure and room temperature for 2 hours. The procedure, identical to that of Example 1, was employed to prepare graft copolymer dispersion employing Polymer B. Polymer B had an amine equivalent weight of 1500 and a Brookfield viscosity at 25° C. of 9620 cps.

EXAMPLES 3 & 4

The "backbone" polymer for this graft was a trimethylolpropane-initiated polyether chain extended with 1 to 2 moles of propylene oxide per each of the initiator's hydroxyl groups. Each of the resulting polyols hydroxyl functions had been replaced by primary amine groups. This amine-terminated polymer was grafted at a 50 percent polymer level with acrylonitrile/styrene (3:1). The procedure is essentially identical to that found in Example 1. Changes in amounts or conditions are noted below:

|  | 3 | 4 |
|---|---|---|
| Amine "backbone" polymer in pot, parts | 332.0 | 332.0 |
| Monomer stream |  |  |
| Acrylonitrile, parts | 375.0 | 375.0 |
| Styrene, parts | 125.0 | 375.0 |
| 2,2'-Azo-bis(isobutyronitrile), parts | 10.0 | 15.0 |
| Amine "backbone" polymer in |  |  |
| catalyst stream, parts | 168.0 | 168.0 |
| Reaction temperature, °C. | 115 | 115 |
| Monomer feed time, min. | 148 |  |
| Catalyst stream feed time, min. | 158 |  |

The resulting amine-terminated graft polymer was a syrup at the reaction temperature and an amber-colored, low melting solid at room temperature.

EXAMPLES 5–10

Polyurethane Foam

Using a one-quart capacity cylindrical container equipped with the Lightning Model V-7 mixer fitted with a shrouded blade, a suitable quantity of polyol and amine-terminated polymer, water, conventional catalysts and silicone surfactant was added to the container. The mixture was stirred for about 30 seconds, allowed to set for about 15 seconds and then stirring was resumed. After about 60 seconds elapsed time, the polyisocyanate was added to the container and the resulting mixture was stirred for about 4 to 5 seconds. The contents of the container were then immediately poured into cardboard cake boxes and the foams were allowed to rise therein. After foam rise was completed, the resulting foams were oven cured for about 5–8 minutes. The following table, Table II, sets forth the ingredients and amounts that were used to prepare the foams as well as the physical properties of the foams. Improved tensile strength, elongation, load deflection and tear strength are obtained in comparison with the prior art graft copolymer dispersions.

TABLE II

| Amine-Terminated Graft Polymer | | | | | |
|---|---|---|---|---|---|
| Viscosity, cps. at 25° C. | | | | | 1410 |
| Calculated composition, % | | | | | |
| 2000 MW polyoxypropylenediamine | | | | | 80 |
| Styrene | | | | | 10 |
| Acrylonitrile | | | | | 10 |
| Formulation, pbw. | 5 | 6 | 7 | 8 | 9 | 10 |
| Polyol A | 120.0 | 120.0 | 120.0 | 120.0 | 120.0 | 120.0 |
| Composition of Ex. 1 | 180.0 | 180.0 | 180.0 | 180.0 | — | — |
| Polyol B | — | — | — | — | 180.0 | 180.0 |
| Water | 8.1 | 8.1 | 8.1 | 8.1 | 8.1 | 8.1 |
| Silicone surfactant | 4.0 | 4.0 | 4.0 | 4.0 | 4.0 | 4.0 |
| Triethylenediamine | 1.5 | 1.5 | 1.5 | 1.5 | 2.1 | 2.1 |
| Dibutyltin dilaurate | 0.1 | 0.1 | 0.1 | 0.1 | 0.1 | 0.2 |
| 80/20 TDI/PAPI |  |  |  |  |  |  |
| (105 index) | 106.9 | 106.9 | 106.9 | 106.9 | 107.14 | 104.14 |
| Properties |  |  |  |  |  |  |
| Rise time, sec. | 73 | 75 | 75 | 75 | 120 | 120 |
| Density, pcf. | 2.11 | 2.09 | 2.11 | 2.21 | 1.96 | 2.37 |
| Tensile, psi. | 21.0 | 20.5 | 21.8 | 21.1 | 14.5 | 16.6 |
| % Elongation | 200 | 200 | 210 | 210 | 157 | 183 |
| Block tear, pi. | 2.97 | 2.93 | 3.03 | 3.22 | 1.80 | 1.63 |
| CLD, psi. |  |  |  |  |  |  |
| 50% defl. | 0.380 | 0.368 | 0.391 | 0.394 | 0.336 | 0.336 |
| CLD, after humid |  |  |  |  |  |  |
| age, 50% defl. | 0.312 | 0.298 | 0.309 | 0.324 | 0.255 | 0.253 |
| Compression set, |  |  |  |  |  |  |
| % at 50% | 44.69 | 41.32 | 41.90 | 45.28 | 10.64 | 14.81 |
| % at 90% | 92.95 | 92.45 | 92.43 | 93.88 | 68.13 | 47.58 |
| Compression set, |  |  |  |  |  |  |
| after humid age |  |  |  |  |  |  |
| % at 50% | 57.78 | 55.33 | 39.11 | 57.73 | 33.60 | 33.14 |
| % at 90% | 87.10 | 89.68 | 86.42 | 87.09 | 79.47 | 75.34 |
| Air flow | 1.20 | 0.95 | 1.35 | 1.43 | 1.12 | 0.95 |

The embodiments of this invention in which an exclusive privilege or property is claimed are defined as follows:

1. A graft polymer dispersion prepared by the in situ polymerization in the presence of an effective amount of a free radical initiator, an ethylenically unsaturated monomer or mixture of monomers in the amount of from 1 to 60 parts of monomer or mixture of monomers per 100 parts of the dispersion product in an amine-terminated polyoxyalkylene polyether polymer.

2. The graft polymer dispersion of claim 1 wherein the polymerization is conducted at a temperature between 25° C. and 150° C.

3. The graft polymer dispersion of claim 1 wherein the amine-terminated polyoxyalkylene polyether polymer has an equivalent weight of 125 to 2500.

4. The graft polymer dispersion of claim 1 wherein the ethylenically unsaturated monomer is selected from the group consisting of styrene, acrylonitrile, vinylidene chloride, methyl methacrylate, acrylamide and mixtures thereof.

5. The graft polymer dispersion of claim 1 wherein the ethylenically unsaturated monomer is a mixture of styrene and acrylonitrile.

6. The graft polymer dispersion of claim 1 wherein the ethylenically unsaturated monomer is acrylonitrile.

7. The graft polymer dispersion of claim 1 wherein the ethylenically unsaturated monomer is styrene.

8. A process for the preparation of a graft polymer dispersion comprising polymerizing in the presence of an effective amount of a free radical initiator, an ethylenically unsaturated monomer or mixture of monomers in the amount of from 1 to 60 parts of monomer or mixture of monomers per 100 parts of the dispersion product in an amine-terminated polyoxyalkylene polyether polymer.

9. The process of claim 8 wherein the polymerization is conducted at a temperature between 25° C. and 150° C.

10. The process of claim 8 wherein the amine-terminated polyoxyalkylene polyether polymer has an equivalent weight of 125 to 2500.

11. The process of claim 8 wherein the ethylenically unsaturated monomer is selected from the group consisting of styrene, acrylonitrile, vinylidene chloride, methyl methacrylate, acrylamide and mixtures thereof.

12. The process of claim 8 wherein the ethylenically unsaturated monomer is a mixture of styrene and acrylonitrile.

13. The process of claim 8 wherein the ethylenically unsaturated monomer is acrylonitrile.

14. The process of claim 8 wherein the ethylenically unsaturated monomer is styrene.

15. A polyurethane prepared by the reaction of an organic polyisocyanate with a graft polymer dispersion prepared by polymerizing in the presence of an effective amount of a free radical initiator, an ethylenically unsaturated monomer or mixture of monomers in the amount of from 1 to 60 parts of monomer or mixture of monomers per 100 parts of the dispersion product in an amine-terminated polyoxyalkylene polyether polymer.

16. The polyurethane of claim 15 wherein the polymerization is conducted at a temperature between 25° C. and 150° C.

17. The polyurethane of claim 15 wherein the amine-terminated polyoxyalkylene polyether polymer has an equivalent weight of 125 to 2500.

18. The polyurethane of claim 15 wherein the ethylenically unsaturated monomer is selected from the group consisting of styrene, acrylonitrile, vinylidene chloride, methyl methacrylate, acrylamide and mixtures thereof.

19. The polyurethane of claim 15 wherein the ethylenically unsaturated monomer is a mixture of styrene and acrylonitrile.

20. The polyurethane of claim 15 wherein the ethylenically unsaturated monomer is acrylonitrile.

21. The polyurethane of claim 15 wherein the ethylenically unsaturated monomer is styrene.

22. The polyurethane of claim 15 prepared in the presence of a blowing agent.

* * * * *